(12) United States Patent
Espinosa Gutierrez et al.

(10) Patent No.: US 9,831,645 B2
(45) Date of Patent: Nov. 28, 2017

(54) SPRING LOADED, BISTABLE CONNECT/DISCONNECT FOR MCC UNIT

(71) Applicant: SCHNEIDER ELECTRIC USA, INC., Schaumburg, IL (US)

(72) Inventors: Victor Daniel Espinosa Gutierrez, San Nicolas de los Garza (MX); Hugo Abraham Vila Delgado, Monterrey (MX); Arturo Javier Cordova Urbiola, Monterry (MX); Manuel Antonio Becerra Becerra, Apodaca (MX)

(73) Assignee: SCHNEIDER ELECTRIC USA, INC., Andover, MA (US)

( * ) Notice: Subject to any disclaimer, the term of this patent is extended or adjusted under 35 U.S.C. 154(b) by 0 days.

(21) Appl. No.: 15/023,463

(22) PCT Filed: Sep. 25, 2013

(86) PCT No.: PCT/US2013/061559
§ 371 (c)(1),
(2) Date: Mar. 21, 2016

(87) PCT Pub. No.: WO2015/047236
PCT Pub. Date: Apr. 2, 2015

(65) Prior Publication Data
US 2016/0218491 A1    Jul. 28, 2016

(51) Int. Cl.
*H02B 11/133* (2006.01)
*H02B 1/36* (2006.01)
(Continued)

(52) U.S. Cl.
CPC ............ *H02B 11/133* (2013.01); *H02B 1/36* (2013.01); *H01H 3/38* (2013.01); *H01H 9/22* (2013.01)

(58) Field of Classification Search
CPC ........... H02B 11/133; H02B 1/36; H01H 3/38
(Continued)

(56) References Cited

U.S. PATENT DOCUMENTS 3,142,003 A   7/1964   Olashaw
3,626,253 A   12/1971  Sturdivan
(Continued)

FOREIGN PATENT DOCUMENTS

EP        2110826 A1      10/2009
WO        2011000838 A1    1/2011
WO    WO2011000838 A1      1/2011

OTHER PUBLICATIONS

International Search Report and Written Opinion dated Mar. 6, 2014 for PCT/US13/61559, 14 pp.
(Continued)

*Primary Examiner* — Edwin A. Leon
*Assistant Examiner* — Iman Malakooti
(74) *Attorney, Agent, or Firm* — Locke Lord LLP

(57) ABSTRACT

A spring loaded, bistable connect/disconnect mechanism for a motor control center (MCC) unit 20, provides a secure and quick means to connect and disconnect the stab 30 of a MCC unit to a vertical power bus 24. The low profile mechanism comprises a series of flat links 6, 7, and 11 and an over-center spring 8 in the top of the MCC unit, for efficient use of space. The mechanism provides an additional force to quickly connect and disconnect the stabs to and from the power bus. The mechanism enables safe insertion and removal of the MCC unit from an MCC section, by incorporating interlocks 5 to prevent the MCC unit from being inserted when the stabs are extended and to prevent the MCC unit from being removed when the stabs are extended. Interlocks prevent the extension or retraction of the stabs when the handle is in an ON position.

15 Claims, 5 Drawing Sheets

(51) Int. Cl.
*H01H 3/38* (2006.01)
*H01H 9/22* (2006.01)

(58) Field of Classification Search
USPC ..................................................... 200/50.21
See application file for complete search history.

(56) References Cited

U.S. PATENT DOCUMENTS

| | | | |
|---|---|---|---|
| 4,033,660 A | 7/1977 | Ericson et al. | |
| 4,139,748 A | 2/1979 | Wolfe et al. | |
| 4,565,908 A | 1/1986 | Bould | |
| 4,789,919 A | 12/1988 | Cox et al. | |
| 5,486,663 A | 1/1996 | Fritsch et al. | |
| 5,486,978 A | 1/1996 | Fishovitz | |
| 5,510,960 A | 4/1996 | Rosen | |
| 6,337,449 B1 | 1/2002 | Brouillat et al. | |
| 6,472,971 B2 | 10/2002 | Toyama et al. | |
| 6,486,421 B1 | 11/2002 | Jones et al. | |
| 6,954,060 B1 | 10/2005 | Edel | |
| 7,688,572 B2 | 3/2010 | Yee et al. | |
| 7,795,551 B2 | 9/2010 | Narayanan et al. | |
| 8,305,739 B2 | 11/2012 | Dozier | |
| 8,331,081 B2 | 12/2012 | Abrahamsen et al. | |
| 8,333,600 B2 | 12/2012 | Yanniello | |
| 8,476,992 B2 | 7/2013 | Yang et al. | |
| 8,514,551 B2 | 8/2013 | Cosley | |
| 9,123,488 B2 | 9/2015 | Seo | |
| 2007/0111575 A1 | 5/2007 | Jensen et al. | |
| 2008/0079436 A1 | 4/2008 | Gollhardt et al. | |
| 2008/0258667 A1 | 10/2008 | Morris et al. | |
| 2010/0024191 A1 | 2/2010 | Ledbetter | |
| 2010/0084920 A1 | 4/2010 | Banting et al. | |
| 2010/0118473 A1 | 5/2010 | Morris et al. | |
| 2010/0280775 A1 | 11/2010 | Schafer et al. | |
| 2011/0110049 A1 | 5/2011 | Lehtola et al. | |
| 2011/0149480 A1 | 6/2011 | Leeman et al. | |
| 2011/0252845 A1 | 10/2011 | Webb et al. | |
| 2012/0039061 A1 | 2/2012 | McBee et al. | |
| 2012/0064746 A1* | 3/2012 | Bellows | H02B 1/36 439/212 |
| 2012/0127636 A1 | 5/2012 | Abrahamsen et al. | |
| 2012/0228097 A1 | 9/2012 | Gemme et al. | |
| 2013/0088812 A1 | 4/2013 | Yee et al. | |
| 2015/0171605 A1 | 6/2015 | Jo et al. | |
| 2016/0036204 A1 | 2/2016 | Schroeder | |
| 2016/0248232 A1 | 8/2016 | Richards et al. | |

OTHER PUBLICATIONS

"Model 6 Export Motor Control Centers", Instruction Bulletin No. 80446-300-01A, Square D Company, Oct. 2001, 66 pages.

* cited by examiner

SPRING LOADED, BISTABLE CONNECT/DISCONNECT FOR MCC UNIT

FIELD OF THE INVENTION

The invention is generally directed to a connect/disconnect mechanism for a motor control center unit.

BACKGROUND OF THE INVENTION

A motor control center, also referred to as an MCC, is generally a cabinet-like structure that is divided into modular sections designed to accept a plurality of component motor control center units, also referred to as MCC units. An MCC unit is generally a drawer-like container of electrical components, such as circuit breakers, motor starters, relays, power meters, programmable logic controllers, and other control circuit components used for electrical power distribution in industrial and commercial applications. The MCC unit slides into an MCC section and plugs into a common power bus running vertically along the back side of the MCC section. The MCC unit includes a connector, also referred to as a stab assembly or stabs, arranged on the back side of the unit, to plug into the power bus. When an MCC unit is installed, serviced, or removed from an MCC section, it is of utmost importance to prevent the operator from being exposed to electrical hazards. In existing MCC units, an operator accessible unit on/off handle on the front of the MCC unit enables a circuit breaker within the unit to be switched off before the MCC unit is installed in or removed from the MCC section.

Unit interlock mechanisms have been provided in the past to prevent inserting or removing MCC units from an MCC section, without first actuating an connect/disconnect handle located on the front of the MCC unit, to retract the stabs of the unit to prevent contact with the power bus. The unit interlock blocks inserting the MCC unit into the motor control center section, without first actuating the connect/disconnect handle for the connect/disconnect mechanism to retract the stabs to prevent contact with a power bus. To insert the MCC unit into the MCC section, the operator slides the MCC unit into an available opening in the section, so that the back wall of the MCC unit is close to the common power bus running along the back side of the section. The operator then actuates the connect/disconnect handle for the connect/disconnect mechanism to connect the stabs of the MCC unit to the power bus.

Many MCC units include circuit breakers connected to the stabs that may be any form of connector of the circuit breaker to the power bus. One example of an existing MCC unit mounts the circuit breaker and the stabs on a pivoted tilting-pan platform. The pivoted tilting-pan platform is connected to the connect/disconnect mechanism that is operated by the connect/disconnect handle. Operating the connect/disconnect handle forces the tilting-pan platform to pivot and either advance the stabs to contact the power bus or retract the stabs to disconnect them from the power bus. The existing unit interlock in an MCC unit, blocks the unit from being inserted into the MCC section when the stabs are advanced, to avoid any connection to the power bus during insertion of the unit. After the MCC unit has been inserted into the MCC section, the unit interlock blocks the unit from being removed from the MCC section after stabs have been advanced and connected to the power bus. The connect/disconnect mechanism must retract the stabs before the unit interlock allows the unit to be removed from the section.

When inserting an MCC unit into an MCC section, it is important to quickly advance the stabs to engage the power bus to minimize shock hazard and to avoid getting stuck in a midway position. Similarly, when retracting the stabs of the MCC unit to disengage the stabs from the power bus, it is important to perform the action quickly to minimize shock hazard and to avoid getting stuck in a midway position.

SUMMARY OF THE INVENTION

A spring loaded, bistable connect/disconnect mechanism for a motor control center unit, provides a secure and quick means to connect and disconnect the stabs of a motor control center unit to a vertical power bus. The mechanism enables quickly advancing and retracting the stabs of an MCC unit to and from a power bus, to minimize shock hazard and to avoid getting stuck in a midway position. The low profile mechanism comprises a series of flat links and an over-center spring element occupying a small space in the top of the MCC unit, for efficient use of the space within the MCC unit. The mechanism is mechanically simple, reliable, and easily operated to supply an additional force to quickly connect and disconnect the stabs to and from the power bus. The mechanism enables safe, closed door or through-door handling of the insertion and removal of the MCC unit from an MCC section, by incorporating interlocks to prevent the MCC unit from being inserted when the stabs are extended and to prevent the MCC unit from being removed when the stabs are extended.

A stab holder is slideably mounted on a top plate support in a motor control center unit. The stab holder has a low profile and is configured to slide in a longitudinal direction to connect a stab of the motor control center unit, to a power bus adjacent to the motor control center unit, when pushed toward the power bus, and to disconnect the stab from the power bus when pulled away from the power bus.

A balance arm has a low profile and is pivotally mounted on the top plate support in the motor control center unit on a first transverse side of the stab holder. The balance arm is pivotally connected to a link connected to the stab holder. The balance arm is configured to follow motion of the stab holder as the stab holder moves through an intermediate longitudinal center point of an over-center spring mechanism, as the stab holder is pushed or pulled in the longitudinal direction.

A spring has a low profile and is mounted on the motor control center unit on a second transverse side of the stab holder opposite to the balance arm. The spring has an end connected to the balance arm. The spring is configured to apply a compression force in the transverse direction, on the balance arm as the balance arm follows the motion of the stab holder as the stab holder moves through the intermediate longitudinal center point.

In this manner, when the stab holder is pushed toward the power bus and moves through the intermediate longitudinal center point, the spring forces the balance arm to further urge the stab holder toward the power bus, quickly advancing the stabs to the power bus, to assume a first bistable position (FIG. 1E). When the stab holder is pulled away from the power bus and moves through the intermediate longitudinal center point, the spring forces the balance arm to further urge the stab holder away from the power bus, quickly retracting the stabs from the power bus, to assume a second bistable position.

BRIEF DESCRIPTION OF THE DRAWINGS

Example embodiments of the invention are depicted in the accompanying drawings that are briefly described as follows.

DETAILED DESCRIPTION OF THE EXAMPLE EMBODIMENTS

Figure 1A:
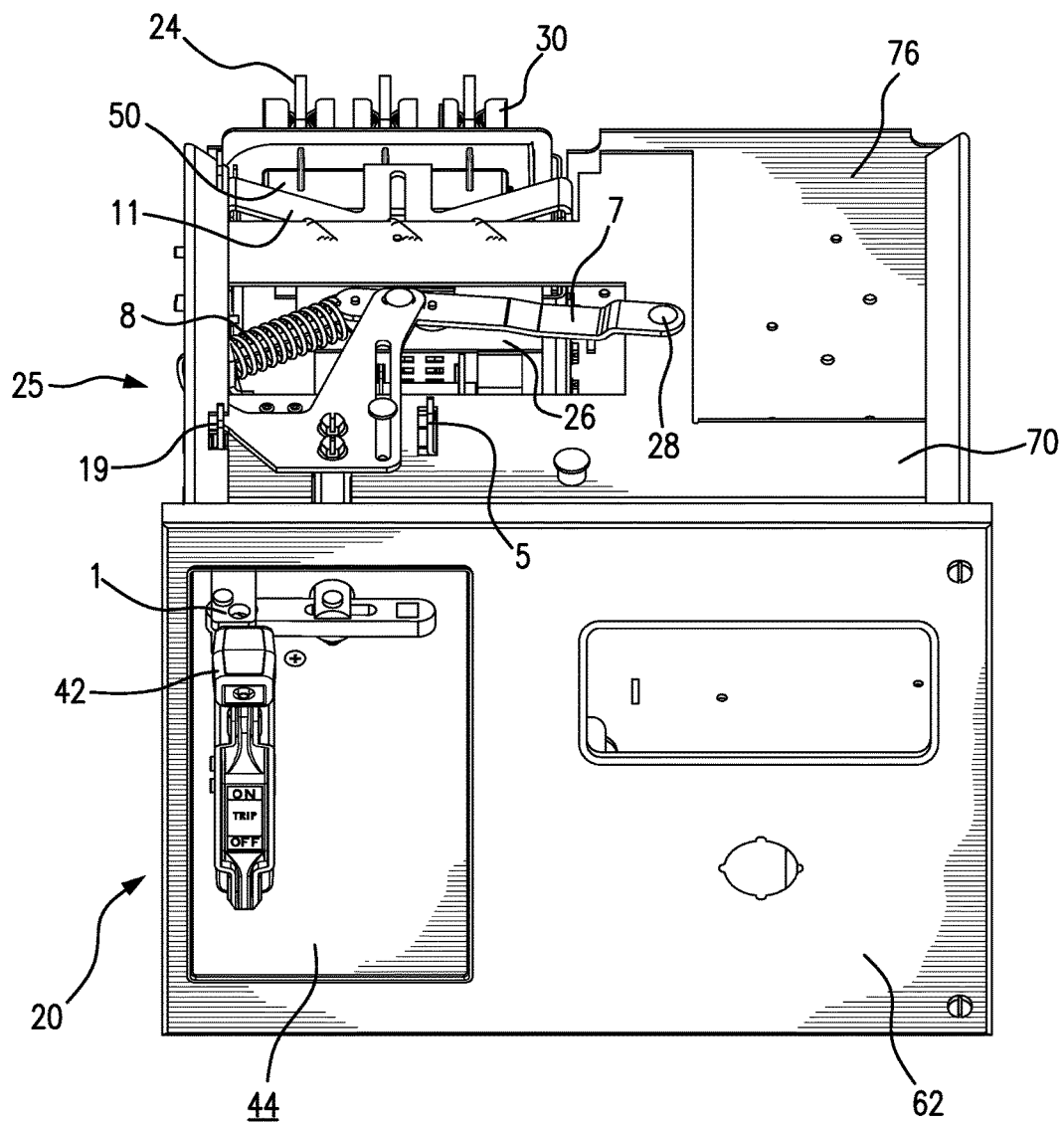
FIG. 1A is a perspective view from the top front side of an example embodiment of the invention in a motor control center unit, illustrating the spring loaded, bistable connect/disconnect mechanism in the motor control center unit.

FIG. 1A is a perspective view from the top front side of an example embodiment of the invention in a motor control center unit 20, illustrating the spring loaded, bistable connect/disconnect mechanism 25 in the motor control center unit 20. The low profile mechanism comprises a series of flat links and an over-center spring element occupying a small space in the top of the MCC unit, for efficient use of the space within the MCC unit. In this FIGURE, the bus stab 30 is shown totally engaged with the power bus 24. In accordance with an example embodiment of the invention, the tilting-pan platform 50 is pivotally mounted by brackets on the back wall 76 of the motor control center unit or cabinet 20. The exterior face 22 of the back wall 76 is configured to be located adjacent to the electrical power bus 24. The tilting-pan platform 50 supports the circuit breaker 26 on the front side thereof and the bus stabs 30 on the back side thereof. The bus stab 30 is insulated from and mounted on the tilting-pan platform 50 and electrically connected to the circuit breaker 26. The bus stab 30 projects through an opening in the back wall 76 of the motor control center unit or cabinet 20, to mechanically engage the electrical power bus 24 for electrical connection therewith, when the tilting-pan platform 50 is pushed backward against the back wall 76. It will be appreciated that the bus is referred to in the singular for simplicity of description, but may comprise several different conductors of different phases, such as the three illustrated here.

In an alternate example embodiment of the invention, the circuit breaker 26 may be statically mounted in the MCC unit, for example being statically mounted on the back wall 76. In an alternate example embodiment of the invention, the bus stabs 30 may be mounted directly on the stab holder 11 so that the bus stabs 30 slide horizontally along with the stab holder 11 and are insulated from the stab holder 11. The bus stabs 30 project through the opening in the back wall 76 of the motor control center unit or cabinet 20, to mechanically engage the electrical power bus 24 for electrical connection therewith, when the stab holder 11 is pushed backward toward the power bus 24.

To insert the motor control center unit 20 into the motor control center section housing, the operator slides the motor control center unit 20 into an available opening in the section, so that the back wall 76 of the motor control center unit 20 is close to the common power bus 24 running along the back side of the section. Interlocks are incorporated to prevent the MCC unit from being inserted when the stabs are extended. Interlocks are also provided to avoid operation of mechanism when breaker is in the ON position. Then, operator can only actuate the connect/disconnect mechanism when handle is in OFF position. The operator may then actuate the connect/disconnect handle 1 mounted on the front wall 44, through the exterior surface of front door 62, for the connect/disconnect mechanism 25, to cause the connect/disconnect mechanism 25 to push the tilting-pan platform 50 to connect the bus stabs 30 of the motor control center unit 20 to the power bus 24. Operating the lever arm 1 for the connect/disconnect mechanism 25 forces the tilting-pan platform 50 backward to connect the bus stabs 30 to the bus 24.

The connect/disconnect mechanism 25 provides a secure and quick means to connect and disconnect the stab 30 of a motor control center unit 20 to a vertical power bus 24. In accordance with an example embodiment of the invention, the connect/disconnect mechanism 25 includes a stab holder 11 that has a low profile and is slideably mounted on a top plate support 70 on the motor control center unit 20. The stab holder 11 is configured to slide along a longitudinal axis 23, shown in FIG. 1C, to connect the stab 30 of the motor control center unit 20, to the power bus 24 adjacent to the motor control center unit 20, when pushed toward the power bus 24. The stab holder 11 is configured to slide along the longitudinal axis 23 to disconnect the stab 30 of the motor control center unit 20, from the power bus 24, when pulled away from the power bus 24.

The connect/disconnect mechanism 25 includes a balance arm 7 that has a low profile and is pivotally mounted on the top plate support 70 of the motor control center unit 20 on a first transverse side of the stab holder 11. The balance arm 7 is pivotally connected to a link 9 that, in turn, is connected to the stab holder 11. The balance arm 7 is configured to follow motion of the stab holder 11 as the stab holder 11 moves through an intermediate longitudinal position or center point 29 of an over-center spring mechanism, as the stab holder 11 is pushed or pulled along the longitudinal axis 23.

An over-center spring mechanism is a mechanical device used to hold a pivoting component in two different resting positions with respect to a fixed pivot point. An over-center spring mechanism typically includes a spring, such as the low profile spring 8 shown in FIG. 1C, attached at one end to a fixed structure, such as the spring support 10, and at the other end is attached to the pivoting component, such as the balance arm 7 that pivots about the pivot point 28 anchored on the top support plate 70. The greatest spring tension/compression force is applied to the balance arm 7 at the center point 29 where the spring 8 applies no torque to the pivoting balance arm 7. As the pivoting balance arm 7 is moved through the center point 29, it is biased away from the center point 29 to one of two resting or bistable positions, either toward the bus 24 or away from the bus 24.

The connect/disconnect mechanism 25 includes the compression spring 8 that is mounted on the top support plate 70 on a second transverse side of the stab holder 11, opposite to the balance arm 7. The top support plate 70 is in turn mounted on the upper frame of the motor control center unit 20. The spring 8 has an end connected to the balance arm 7, configured to apply a compression force along the transverse axis 27, shown in FIG. 1C, on the balance arm 7 as the balance arm 7 follows the motion of the stab holder 11 as the stab holder moves through the intermediate longitudinal position or center point 29.

Figure 1B:
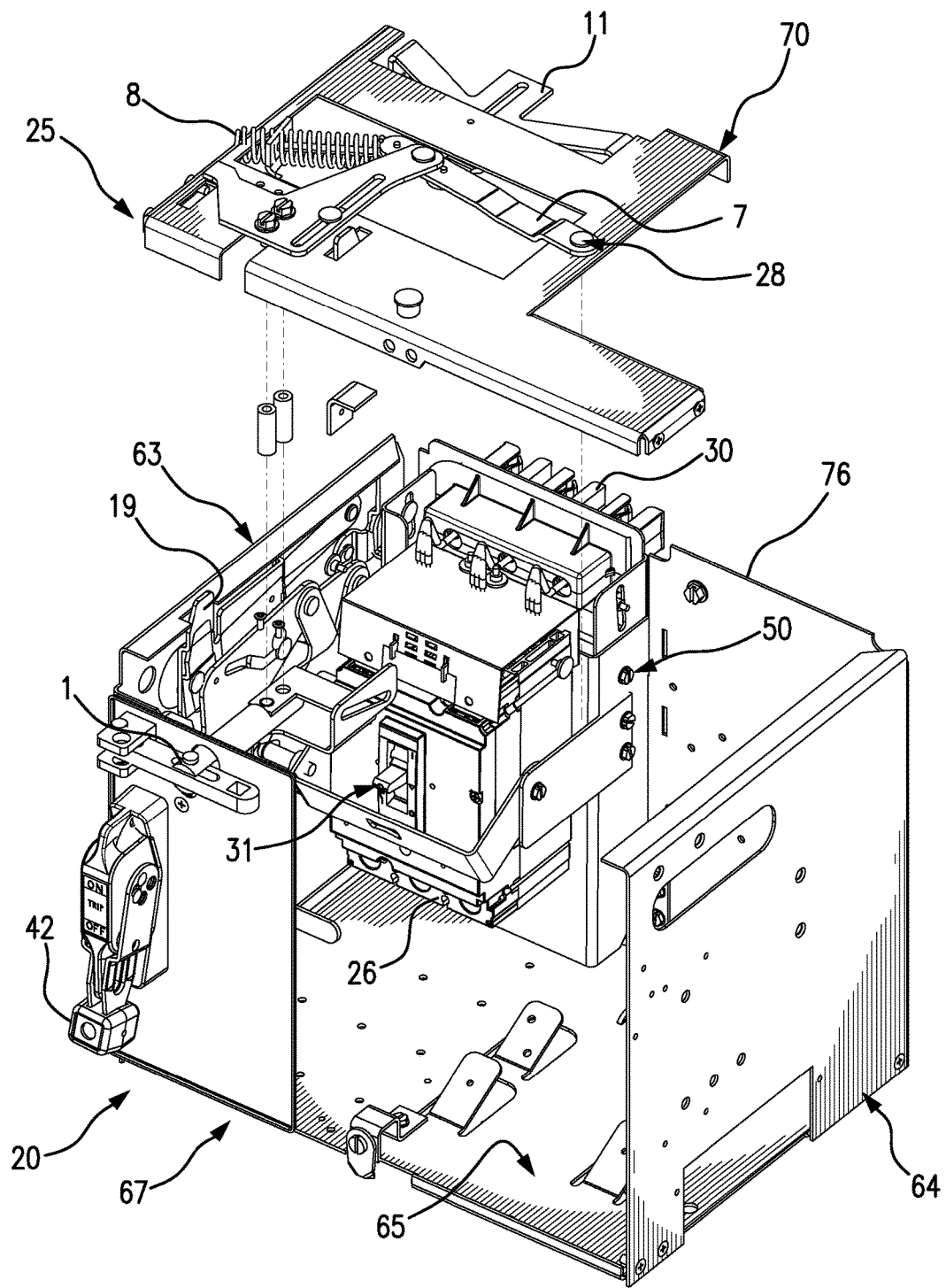
FIG. 1B is a perspective view from the top right side of the motor control center unit of FIG. 1A, illustrating an exploded view of the spring loaded, bistable connect/disconnect mechanism and the motor control center unit.
Figure 1C:
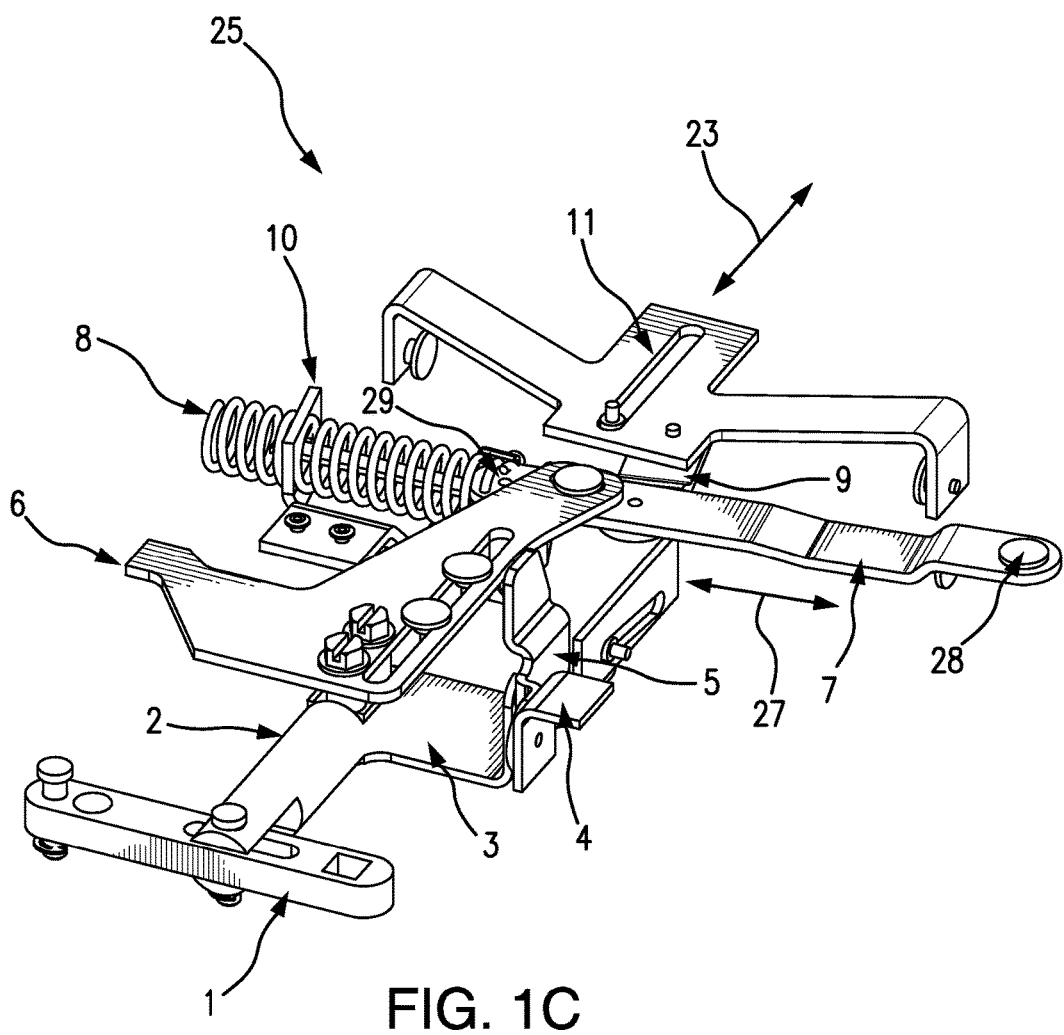
FIG. 1C is a perspective view from the top right side of an example embodiment of the components of the spring loaded, bistable connect/disconnect mechanism in the example embodiment of the invention of FIG. 1B.
Figure 1D:
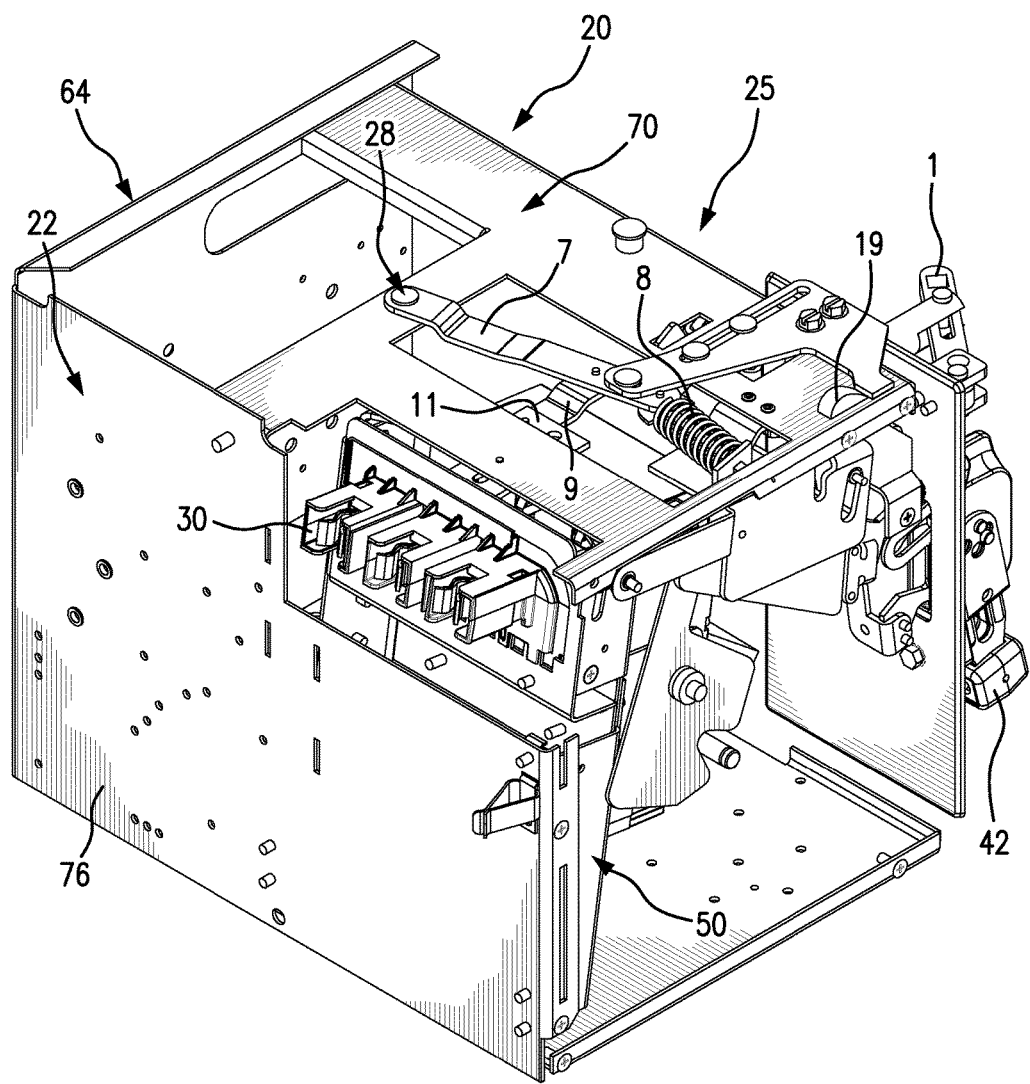
FIG. 1D is a perspective view from the top right side of the back of the motor control center unit of FIG. 1A, illustrating the stab and spring loaded, bistable connect/disconnect mechanism in the retracted position, disconnecting the stab from the power bus.
Figure 1E:
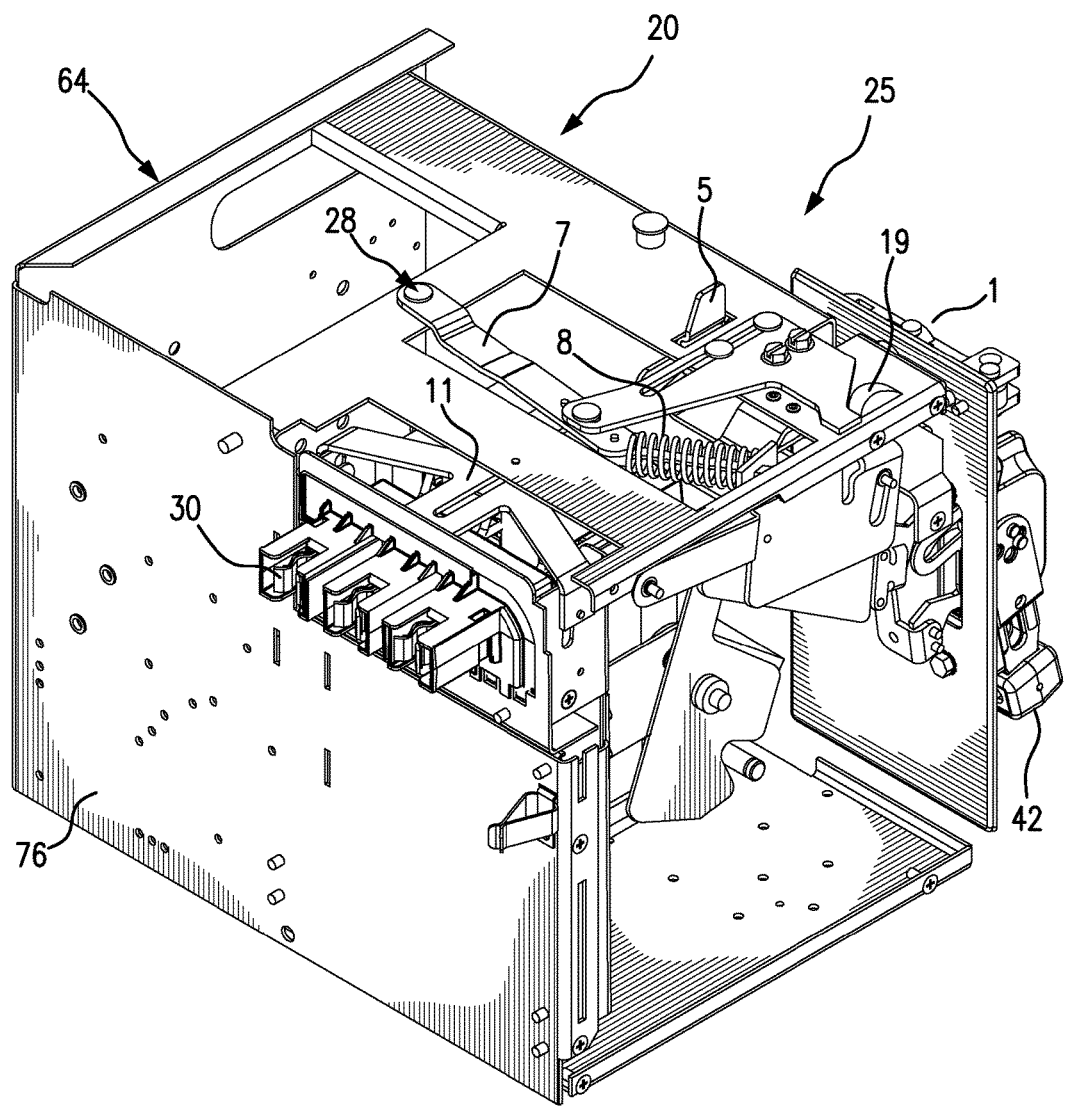
FIG. 1E is a perspective view from the top right side of the back of the motor control center unit of FIG. 1D, illustrating the stab and spring loaded, bistable connect/disconnect mechanism in the extended position which will connect the stab to the power bus.

In accordance with an example embodiment of the invention, when the stab holder 11 is pushed toward the power bus 24 and moves through the intermediate position or center point 29, shown in FIG. 1C, the spring 8 forces the balance arm 7 to further urge the stab holder 11 toward the power bus 24, quickly advancing the stabs to the power bus, to assume a first bistable position, as shown in FIG. 1E. In accordance with an example embodiment of the invention, when the stab holder 11 is pulled away from the power bus 24 and moves through the intermediate position or center point 29, the spring 8 forces the balance arm 7 to further urge the stab holder 11 away from the power bus 24, quickly retracting the stabs from the power bus, to assume a second bistable position (FIG. 1D). The mechanism is easily operated to supply an additional force to quickly connect and disconnect the stabs to and from the power bus.

FIG. 1B is a perspective view from the top right side of the motor control center unit 20 of FIG. 1A, illustrating an exploded view of the spring loaded, bistable connect/disconnect mechanism 25 normally mounted to the motor control center unit 20. The motor control center unit 20 includes a housing configured to be inserted into a motor control center (not shown). The housing includes an outer structure comprising right side wall 63, left side wall 64, a bottom plate 65, a back wall 76, and a front door 62 hinged to the right side wall 63 and configured to open a front side 67 of the housing to provide access to an interior space. An exterior face of the back wall 76 of the housing is configured to be located adjacent to the electrical power bus 24 when the housing has been inserted into the motor control center.

In an example embodiment of the invention, the pivoted tilting-pan platform 50 may be mounted on a pivot fastened to an interior face of the back wall 76 of the housing. The tilting-pan platform 50 supports the circuit breaker 26 on a front side of the tilting-pan platform 50 and supports the stabs 30 on a back side of the tilting-pan platform 50. The stabs 30 are electrically connected to a circuit breaker controllable by a circuit breaker switch handle 31 of the circuit breaker 26. The stabs 30 are configured to project through an opening in the back wall 76 of the housing, to mechanically and electrically engage the power bus 24 for electrical connection therewith, when the tilting-pan platform 50 is pushed in a backward direction on the pivot against the back wall 76.

The connect/disconnect handle 1 located on the front side 67 of the housing, mounted on the front wall 44, through the exterior surface of front door 62, is connected to the top mounted, spring loaded, bistable connect/disconnect mechanism 25. The connect/disconnect handle 1 is configured to push the pivoted tilting-pan platform 50 to connect the stabs 30 to the power bus 24 or pull the pivoted tilting-pan platform 50 to disconnect the stabs 30 from the power bus 24. The mechanism enables safe, closed door or through-door handling of the insertion and removal of the MCC unit from an MCC section.

The connect/disconnect assembly for a motor control center unit is mechanically simple and reliable. In an example embodiment of the invention, the connect/disconnect assembly includes the pivoted tilting-pan platform 50, the stab holder 11, the balance arm 7, and the spring 8. When the stab holder 11 is pushed toward the power bus 24 and moves through the intermediate longitudinal center point 29, the spring 8 forces the balance arm 7 to further urge the stab holder 11 and the tilting-pan platform 50 toward the power bus 24, to assume a first bistable position. When the stab holder 11 is pulled away from the power bus 24 and moves through the intermediate longitudinal center point 29, the spring 8 forces the balance arm 7 to further urge the stab holder 11 and the tilting-pan platform 50 away from the power bus 24, to assume a second bistable position.

In an alternate example embodiment of the invention, the bus stabs may be mounted directly on the stab holder so that the bus stabs slide horizontally along with the stab holder and are insulated from the stab holder. The bus stabs may be electrically connected to the circuit breaker by a connector that may be fixed or flexible, for example. The bus stabs project through the opening in the back wall of the motor control center unit or cabinet, to mechanically engage the electrical power bus for electrical connection therewith, when the stab holder is pushed backward toward the power bus. The connect/disconnect handle is configured to push the stab holder to connect the stabs to the power bus or pull the stab holder to disconnect the stabs from the power bus. The mechanism enables safe, closed door or through-door handling of the insertion and removal of the MCC unit from an MCC section. In the alternate example embodiment of the invention, the connect/disconnect assembly includes the stabs, the stab holder, the balance arm, and the spring. When the stab holder pushes the stabs toward the power bus and moves through the intermediate longitudinal center point, the spring forces the balance arm to further urge the stab holder toward the power bus, to assume a first bistable position. When the stab holder pulls the stabs away from the power bus and moves through the intermediate longitudinal center point, the spring forces the balance arm to further urge the stab holder away from the power bus, to assume a second bistable position.

FIG. 1C is a perspective view from the top right side of an example embodiment of the components of the spring loaded, bistable connect/disconnect mechanism 25 in the example embodiment of the invention of FIG. 1B. The connect/disconnect handle 1 may be actuated by the operator to move the pushing rod 2. The FIGURE shows the bistable connect/disconnect mechanism 25 in the fully extended position that pushes the stab holder 11 toward the power bus 24. The pushing rod 2 is connected to the interlock link 3 that supports the interlock bracket 4 and the actuation plate 6.

In accordance with an example embodiment of the invention, the insertion interlock 5 rides in a slot of the interlock bracket 4 and rises to engage the motor control center section housing when the bistable connect/disconnect mechanism 25 is in the fully extended position that pushes the stab holder 11 and stab 30 toward the power bus 24. In this manner, the motor control center unit may not be inserted into an available opening in the motor control center section housing when the stabs are extended. Similarly, the motor control center unit may not be removed from the motor control center section housing when the stabs are extended.

FIG. 1D is a perspective view from the top right side of the back of the motor control center unit 20 of FIG. 1A, illustrating the stab 30 and spring loaded, bistable connect/disconnect mechanism 25 in the retracted position, disconnecting the stab 30 from the power bus 24 (FIG. 1A). In accordance with an example embodiment of the invention, when the stab holder 11 is pulled away from the power bus 24 and moves through the intermediate position or center point 29, the spring 8 forces the balance arm 7 to further urge the stab holder 11 away from the power bus 24, to assume a second bistable position.

FIG. 1E is a perspective view from the top right side of the back of the motor control center unit 20 of FIG. 1D, illustrating the stab 30 and spring loaded, bistable connect/disconnect mechanism 25 in the extended position, connecting the stab 30 to the power bus 24. In accordance with an example embodiment of the invention, when the stab holder 11 is pushed toward the power bus 24 and moves through the intermediate position or center point 29, shown in FIG. 1C, the spring 8 forces the balance arm 7 to further urge the stab holder 11 toward the power bus 24, to assume a first bistable position, as shown in FIG. 1E.

The handle interlock 19 of FIG. 1A, is coupled to a unit on/off handle 42, for the circuit breaker 26, mounted on a front wall 44 of the motor control center unit 20, and is configured to prevent the stab holder 11 from being pulled away from the power bus 24 when the unit on/off handle 42 is in an on position. The handle interlock 19 blocks the bistable connect/disconnect mechanism 25 from retracting the stabs 30 to disconnect from the power bus 24 until the on/off handle 42 is repositioned into the off-position.

The insertion interlock 5 shown in FIGS. 1A and 1C, is coupled to the stab holder 11 in the motor control center unit 20, and is configured to engage the framing of a motor control center section (not shown) housing the motor control center unit 20, to prevent the motor control center unit 20 from being inserted or removed from the motor control center section housing, when the stab holder 11 is in the first bistable position toward the power bus.

Although specific example embodiments of the invention have been disclosed, persons of skill in the art will appreciate that changes may be made to the details described for the specific example embodiments, without departing from the spirit and the scope of the invention.

What is claimed is:

1. A connect/disconnect mechanism for a motor control center unit, comprising:
    a stab holder slideably mounted on a motor control center unit, configured to slide in a longitudinal direction to connect a stab of the motor control center unit, to a power bus adjacent to the motor control center unit, when pushed toward the power bus, and to disconnect the stab from the power bus when pulled away from the power bus;
    a balance arm pivotally mounted on the motor control center unit on a first transverse side of the stab holder, pivotally connected to a link connected to the stab holder, configured to follow motion of the stab holder as the stab holder moves through an intermediate longitudinal center point of an over-center spring mechanism, as the stab holder is pushed or pulled in the longitudinal direction;
    a spring mounted on the motor control center unit on a second transverse side of the stab holder opposite to the balance arm, having an end connected to the balance arm, configured to apply a compression force in the transverse direction, on the balance arm as the balance arm follows the motion of the stab holder as the stab holder moves through the intermediate longitudinal center point;
    whereby when the stab holder is pushed toward the power bus and moves through the intermediate longitudinal center point, the spring forces the balance arm to further urge the stab holder toward the power bus, to assume a first bistable position, and when the stab holder is pulled away from the power bus and moves through the intermediate longitudinal center point, the spring forces the balance arm to further urge the stab holder away from the power bus, to assume a second bistable position.

2. The connect/disconnect mechanism for a motor control center unit of claim 1, further comprising:
    a connect/disconnect handle pivotally mounted on a front wall of the motor control center unit and coupled to the stab holder through the front wall, and configured to enable an operator to move the connect/disconnect handle to either connect the stab to the power bus or disconnect the stab from the power bus.

3. The connect/disconnect mechanism for a motor control center unit of claim 1, further comprising:
    a handle interlock coupled to a unit on/off handle mounted on a front wall of the motor control center unit, configured to prevent the stab holder from being pulled away from the power bus when the unit on/off handle is in an on position.

4. The connect/disconnect mechanism for a motor control center unit of claim 1, further comprising:
    an insertion interlock coupled the stab holder in the motor control center unit, configured to engage a motor control center section housing the motor control center unit, to prevent the motor control center unit from being inserted or removed from the motor control center section housing, when the stab holder is in the first bistable position toward the power bus.

5. The connect/disconnect mechanism for a motor control center unit of claim 1, further comprising:
    a tilting-pan platform pivotally mounted in the motor control center unit, supporting the stab and a circuit breaker electrically connected to the stab, the tilting-pan platform being coupled to the stab holder and configured to connect the stab to the power bus when the tilting-pan platform is pushed by the stab holder toward the power bus.

6. A motor control center unit, comprising:
    a housing configured to be inserted into a motor control center, the housing including an outer structure comprising side walls, a bottom plate, a back wall, and a front door hinged to one of the side walls and configured to open a front side of the housing to provide access to an interior space, an exterior face of the back wall of the housing being configured to be located adjacent to an electrical power bus when the housing has been inserted into the motor control center;
    stabs configured to project through an opening in the back wall of the housing, to mechanically and electrically engage the power bus for electrical connection therewith, when pushed in a backward direction toward the power bus, the stabs being electrically connected to a circuit breaker electrical switch actuated by a circuit breaker switch handle of a circuit breaker located within the housing;
    a connect/disconnect handle located on the front side of the housing, connected to a spring loaded, bistable connect/disconnect mechanism configured to push the stabs to connect the stabs to the power bus or pull the stabs to disconnect the stabs from the power bus;
    the spring loaded, bistable connect/disconnect mechanism, comprising:
    a stab holder slideably mounted on the motor control center unit, configured to slide in a longitudinal direction to connect the stabs to the power bus, when pushed toward the power bus, and to disconnect the stabs from the power bus when pulled away from the power bus;

a balance arm pivotally mounted on the motor control center unit on a first transverse side of the stab holder, pivotally connected to a link connected to the stab holder, configured to follow motion of the stab holder as the stab holder moves through an intermediate longitudinal center point, as the stab holder is pushed or pulled in the longitudinal direction;

a spring mounted on the motor control center unit on a second transverse side of the stab holder opposite to the balance arm, having an end connected to the balance arm, configured to apply a compression force in the transverse direction, on the balance arm as the balance arm follows the motion of the stab holder as the stab holder moves through the intermediate longitudinal center point;

whereby when the stab holder is pushed toward the power bus and moves through the intermediate longitudinal center point, the spring forces the balance arm to further urge the stab holder toward the power bus, to assume a first bistable position, and when the stab holder is pulled away from the power bus and moves through the intermediate longitudinal center point, the spring forces the balance arm to further urge the stab holder away from the power bus, to assume a second bistable position.

7. The motor control center unit of claim 6, further comprising:
a pivoted tilting-pan platform mounted on a pivot fastened to an interior face of the back wall of the housing, the tilting-pan platform supporting the circuit breaker on a front side of the tilting-pan platform and supporting the stabs on a back side of the tilting-pan platform, the stabs being configured to project through the opening in the back wall of the housing, to mechanically and electrically engage the power bus for electrical connection therewith, when the tilting-pan platform is pushed in a backward direction on the pivot against the back wall.

8. The motor control center unit of claim 6, further comprising:
a handle interlock coupled to a unit on/off handle mounted on a front wall of the motor control center unit, configured to prevent the stab holder from being pulled away from the power bus when the unit on/off handle is in an on position.

9. The motor control center unit of claim 6, further comprising:
an insertion interlock coupled the stab holder in the motor control center unit, configured to engage a motor control center section housing the motor control center unit, to prevent the motor control center unit from being inserted or removed from the motor control center section housing, when the stab holder is in the first bistable position toward the power bus.

10. The motor control center unit of claim 6, further comprising:
wherein the spring loaded, bistable connect/disconnect mechanism is low profile and comprises a series of flat links and a low profile, over-center spring element occupying a small space in the top of the motor control center unit, for efficient use of the space within the motor control center unit.

11. The motor control center unit of claim 6, further comprising:
wherein the spring loaded, bistable connect/disconnect mechanism is mechanically simple, reliable, and easily operated to supply an additional force to quickly connect and disconnect the stabs to and from the power bus.

12. The motor control center unit of claim 6, further comprising:
wherein the spring loaded, bistable connect/disconnect mechanism enables safe, closed door or through-door handling of insertion and removal of the motor control center unit from a motor control center unit section, by incorporating interlocks to prevent the motor control center unit from being inserted when the stabs are extended and to prevent the motor control center unit from being removed when the stabs are extended.

13. A connect/disconnect assembly for a motor control center unit, comprising:
stabs moveably mounted in a motor control center unit, the stabs configured to project through an opening in a back wall of the motor control center unit, to mechanically and electrically engage a power bus adjacent to the motor control center unit, when pushed in a backward direction toward the power bus, the stabs being electrically connected to a circuit breaker;

a stab holder connected to the stabs and slideably mounted on the motor control center unit, configured to slide in a longitudinal direction to connect the stabs to the power bus, when pushed toward the power bus, and to disconnect the stab from the power bus when pulled away from the power bus;

a balance arm pivotally mounted on the motor control center unit on a first transverse side of the stab holder, pivotally connected to a link connected to the stab holder, configured to follow motion of the stab holder as the stab holder moves through an intermediate longitudinal center point of an over-center spring mechanism, as the stab holder is pushed or pulled in the longitudinal direction;

a spring mounted on the motor control center unit on a second transverse side of the stab holder opposite to the balance arm, having an end connected to the balance arm, configured to apply a compression force in the transverse direction, on the balance arm as the balance arm follows the motion of the stab holder as the stab holder moves through the intermediate longitudinal center point;

whereby when the stab holder is pushed toward the power bus and moves through the intermediate longitudinal center point, the spring forces the balance arm to further urge the stab holder toward the power bus, to assume a first bistable position, and when the stab holder is pulled away from the power bus and moves through the intermediate longitudinal center point, the spring forces the balance arm to further urge the stab holder away from the power bus, to assume a second bistable position.

14. The connect/disconnect assembly for a motor control center unit of claim 13, further comprising:
a pivoted tilting-pan platform mounted on a pivot fastened to an interior face of the back wall of the motor control center unit, the tilting-pan platform supporting the circuit breaker on a front side of the tilting-pan platform and supporting the stabs on a back side of the tilting-pan platform, the stabs configured to project through the opening in the back wall of the motor control center unit, to mechanically and electrically engage the power bus for electrical connection therewith, when the tilting-pan platform is pushed in a backward direction on the pivot against the back wall.

15. The connect/disconnect assembly for a motor control center unit of claim 13, further comprising:
a connect/disconnect handle pivotally mounted on a front wall of the motor control center unit and coupled to the stab holder through a front door of the motor control center unit, and configured to enable an operator to move the connect/disconnect handle to either connect the stab to the power bus or disconnect the stab from the power bus.

* * * * *